INVENTOR:
James W. Kelso
By Smyth, Roston & Pavitt
ATTORNEYS

TAPE CARTRIDGE SYSTEM

Filed July 14, 1967 4 Sheets-Sheet 2

INVENTOR
James W. Kelso

By [signature]
ATTORNEYS

INVENTOR:
James W. Kelso
By Smyth, Roston & Pavitt
ATTORNEYS

INVENTOR
James W. Kelso
By Smyth, Roston & Pavitt
ATTORNEYS

United States Patent Office 3,552,751
Patented Jan. 5, 1971

3,552,751
TAPE CARTRIDGE SYSTEM
James W. Kelso, Pacific Palisades, Calif., assignor to Tenna Corporation, Cleveland, Ohio
Filed July 14, 1967, Ser. No. 653,437
Int. Cl. G11b 5/00
U.S. Cl. 274—4 5 Claims

ABSTRACT OF THE DISCLOSURE

A cartridge player includes two sets of cams for controlling the position of a reproducing head to reproduce the information on either four track or eight-track tape cartridges, and a feeler arm and associated linkage for automatically switching between the cams upon the insertion of either four-track or eight-track cartridges. After the four track or eight track cartridge is inserted, an actuating member is controlled by a switch on the front panel of the machine to rotate the appropriate cam to present different camming surfaces to control the position of the reproducing head. The player also includes a locking member having an acute forward facing angle portion which is mounted at the end of a resilient member so as to lock the eight-track cartridge while permitting the easy insertion of the four-track cartridge, and a resiliently mounted pinch roller and a cam member located at the bottom of the pinch roller facilitates the removal of the four track cartridge from the player.

The present invention relates to a compatible tape cartridge playback machine for reproducing information recorded on existing four-track and eight-track magnetic tape cartridges. The use of magnetic tape cartridges for storing audio information is finding increasing favor with the public. Specifically, magnetic tape cartridge systems have found great acceptability for use in automobiles because of the convenience and ease of operation of these systems. The use of magnetic tape cartridges for the replay of audio information is also being used at an increasing rate in the home.

The magnetic tape cartridges generally in use include an inside-outside endless belt construction of magnetic tape enclosed by an outer housing containing open areas along the front edge of the housing for access to the magnetic tape. The tape cartridge is merely inserted into a playback unit for playback of information through the access opening, thereby eliminating the normal tape handling and threading which is necessary with the present reel-to-reel magnetic tape systems. The user of the magnetic tape cartridge, therefore, can replay the information recorded on the magnetic tape cartridge without any handling of the magnetic tape.

Unfortunately, the magnetic tape cartridge industry has not yet settled on standards for the construction of the magnetic tape cartridges. A first common type of magnetic tape cartridge has four tracks of information (i.e., two sets of stereo pairs) recorded on the magnetic tape, has no internal pitch roller, but has an opening in the bottom wall of the cartridge housing for receiving an external pinch roller which is contained in the playback unit.

A second common type of magnetic tape cartridge has eight tracks of information (i.e., four sets of stereo pairs) recorded on the magnetic tape and includes a pinch roller located within the cartridge, thereby eliminating the necessity for an external pinch roller located within the playback machine. The two tape cartridges are generally of the same size and configuration except the four-track cartridge has a substantially square front profile whereas the eight-track magnetic tape cartridge has a tapered front profile.

It is desirable to have a compatible magnetic tape cartridge playback machine which will accept and play back both types of magnetic tape cartridges described above. It is also desirable for the compatible magnetic tape cartridge playback machine to distinguish between the different magnetic tape cartridges described above so as to provide for the insertion of an external pinch roller through the opening in the bottom of the four-track cartridge when the four-track cartridge is inserted into the playback unit. The playback unit should also determine when an eight-track cartridge has been inserted into the machine so as not to activate the external pinch roller. Applicant has provided for such a compatible magnetic tape playback machine and has disclosed such a machine in copending application Ser. No. 544,065, filed Apr. 21, 1966.

The copending application discloses the use of a feeler arm which is responsive to the substantially square front portion of the four-track cartridge so as to activate the external pinch roller when the four-track cartridge is inserted in the playback unit. The feeler arm fits within the tapered front portion of the eight-track cartridge so that the pinch roller is not activated when the eight-track cartridge is inserted in the playback machine. The copending application also discloses the use of a movably mounted magnetic reproducing head which is movable between six discrete positions by a manual control located on the front panel of the playback unit so as to move the magnetic reproducing head to reproduce the information on both the four-track and eight-track tape cartridges. The present invention is directed to an improved magnetic tape cartridge playback machine which is more fully automatic in operation and provides for improved performance over the magnetic tape cartridge playback machine shown in the copending application.

In the magnetic tape cartridge machine shown in the copending application, the magnetic head is manually controlled from the front panel. The magnetic head of the copending application can be controlled to be in the wrong position for the reproduction of information from either the four-track or eight-track tapes since the playback machine shown in the copending application includes a single cam member having six different camming surfaces. The present invention eliminates any wrong positioning of the magnetic tape by the use of a composite cam member having two camming areas, each including camming surfaces. The camming areas of the composite cam member control the basic position of the reproducing head to reproduce the information recorded on the four-track and eight-track magnetic tape cartridges and the camming areas are automatically switched upon the insertion of the four-track or eight-track magnetic tape cartridges. The present invention includes coupling between the composite cam member and the feeler arm so as to distinguish between the different types of tape cartridges.

The operation of the feeler arm controls the position of the composite cam member so as to present the camming surfaces of a particular one of the two camming areas to control the position of the magnetic reproducing head. For example, the composite cam member may be rotatable so as to couple different ones of the camming surfaces to control the position of the reproducing head. Also, the composite cam member is movable in a linear direction along its axis of rotation so as to control which one of the camming areas is coupled to control the magnetic reproducing head. The linear movement of the composite cam member may be controlled by the insertion of either one of the magnetic tape cartridges. Specifically, the linear movement may be controlled by connecting the composite cam member to the feeler arm assembly so as to be responsive to the movement of the feeler arm assembly.

After the magnetic tape cartridge is inserted and the composite cam member is automatically controlled to present the proper camming area in accordance with the type of tape cartridge which is inserted, the different camming surfaces of that camming area may be coupled to the magnetic reproducing head by rotating the composite cam member. The rotation of the composite cam member may be solenoid actuated and the solenoid may be controlled by a switch member mounted on the front panel of the magnetic tape cartridge machine. With the magnetic tape cartridge machine of the present invention, it is impossible to reproduce information from either the four-track or eight-track magnetic tape cartridges where the magnetic reproducing head is positioned wrongly.

Since the composite cam member controls the position of the reproducing head, the reproducing head may include a cam follower which rides on the various camming surfaces of the camming areas of the composite cam member. In order to provide for a smooth transition of the cam follower between the camming areas, the camming areas of the composite cam member are separated by an intermediate section which has a configuration so as to always provide for the smooth transition between the camming areas.

The magnetic tape cartridge machine of the present invention also includes an improved locking device. The eight-track tape cartridge currently in use has a V-shaped slot on one side of the cartridge. It is necessary to provide a locking device in the playback unit so as to provide forward pressure on the eight-track cartridge so as to insure proper pressure between the internal pinch roller located within the tape cartridge and the capstan located within the playback machine. The four-track cartridge does not need an external locking member since the external pinch roller located within the playback machine when rotated within the four-track cartridge provides for the forward pressure so as to insure the proper pressure between the external pinch roller and the capstan.

The locking device commonly used and provided on the magnetic tape cartridge machine as shown in the copending application included a roller supported at the end of a resilient member. This type of locking device created difficulties with the insertion of the four-track cartridge since the square front profile of the four-track cartridge and the roller locking device would sometimes interfere with each other, preventing the insertion of the four-track cartridge. The present invention includes a locking member which has an acute forward-facing angle portion so as to pass the square front profile of the four-track tape cartridge and allow for a smooth easy insertion of the four-track tape cartridge. The locking member also provides for a locking and forward pressure within the V-shaped slot of the eight-track tape cartridge. The locking member of the present invention is preferably mounted at the end of a resilient member. The locking member of the present invention also may use two rollers mounted so as to further reduce the friction upon insertion of the cartridges.

Another difficulty which was experienced with the operation of the magnetic tape cartridge unit shown in the copending application was interference between the external pinch roller and the opening on the bottom of the four-track cartridge. Upon the removal of the four-track cartridge, the underside of the pinch roller would interfere with the bottom opening of the four-track tape cartridge, thereby creating difficulty in the removal of the four-track tape cartridge.

The present invention includes an improved pinch roller construction in combination with a cam member and wherein the pinch roller is resiliently mounted at the end of the pinch roller shaft. The resilient mounting of the pinch roller provides for a linear movement of the pinch roller along the axis of the shaft. As the four-track magnetic tape cartridge is removed from the tape cartridge machine, the cam member initially engages the wall of the opening in the bottom of the four-track tape cartridge. The cam member slides against the wall of the opening until the pinch roller engages the wall of the opening but the linear movement of the pinch roller allows the pinch roller to clear the opening in the tape cartridge as the four-track tape cartridge is removed.

The present invention, therefore, is directed to an improved magnetic tape cartridge machine which is more fully automatic than the magnetic tape cartridge machine shown in the copending application. The present invention also includes improvements which facilitates the insertion and removal of magnetic tape cartridges. A clearer understanding of a particular embodiment which is used to exemplify the invention will be had with reference to the drawings wherein.

Figure 1:
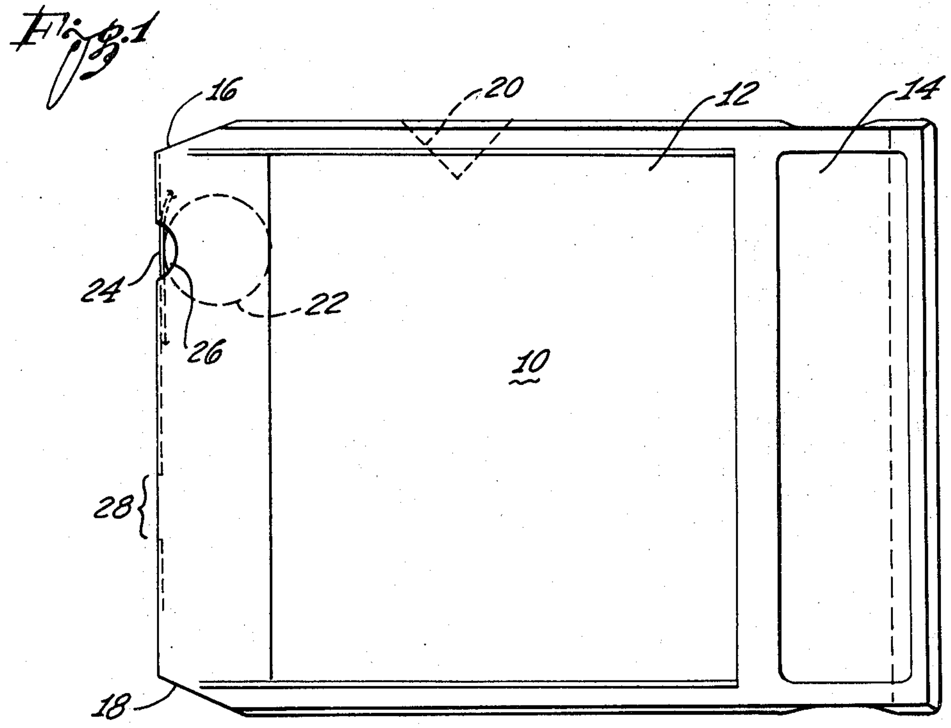
FIG. 1 is a top view of an eight-track magnetic tape cartridge currently in use.
Figure 2:
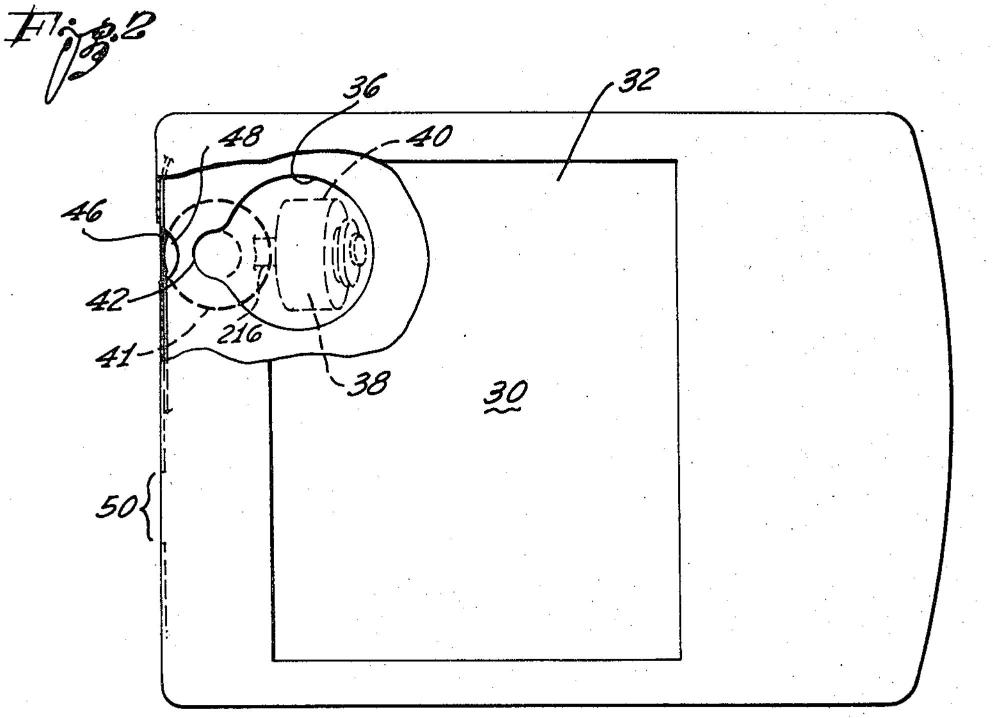
FIG. 2 is a top partially cut away view of a four track magnetic tape cartridge currently in use.
Figure 5:
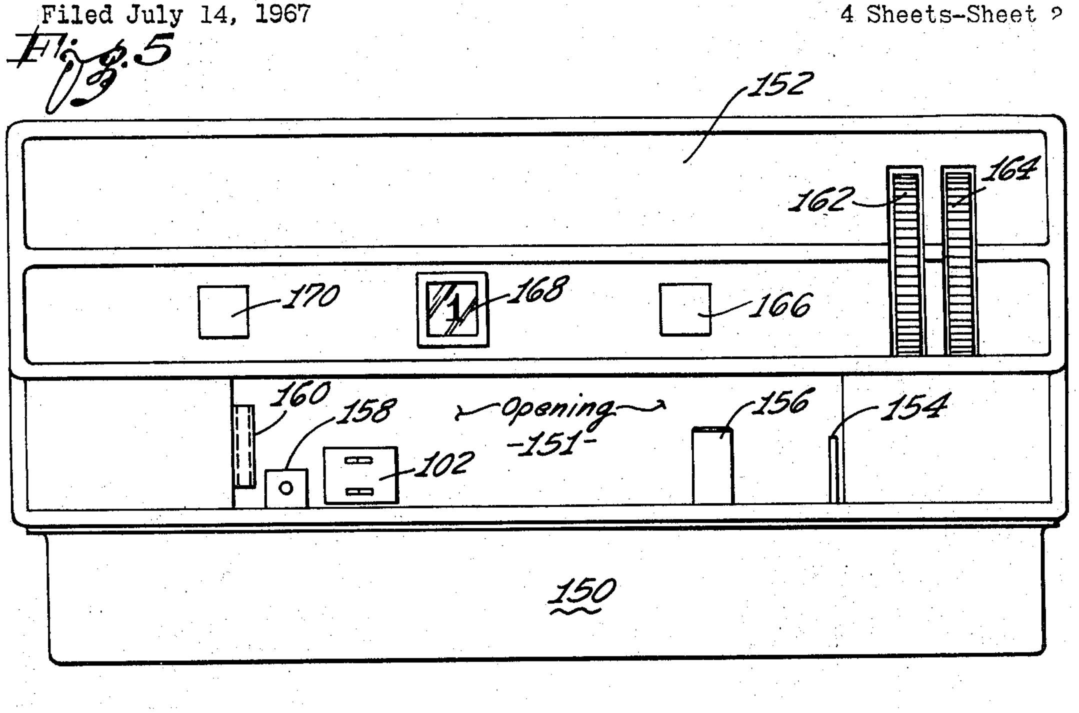
Figure 3:
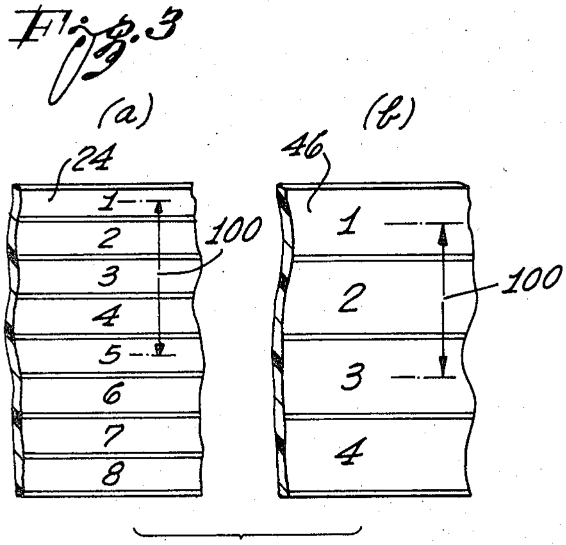
Figure 4:
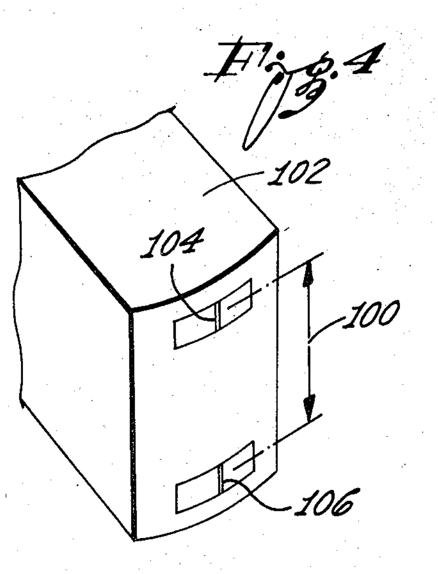
Figures 6, 7, 8, 9:
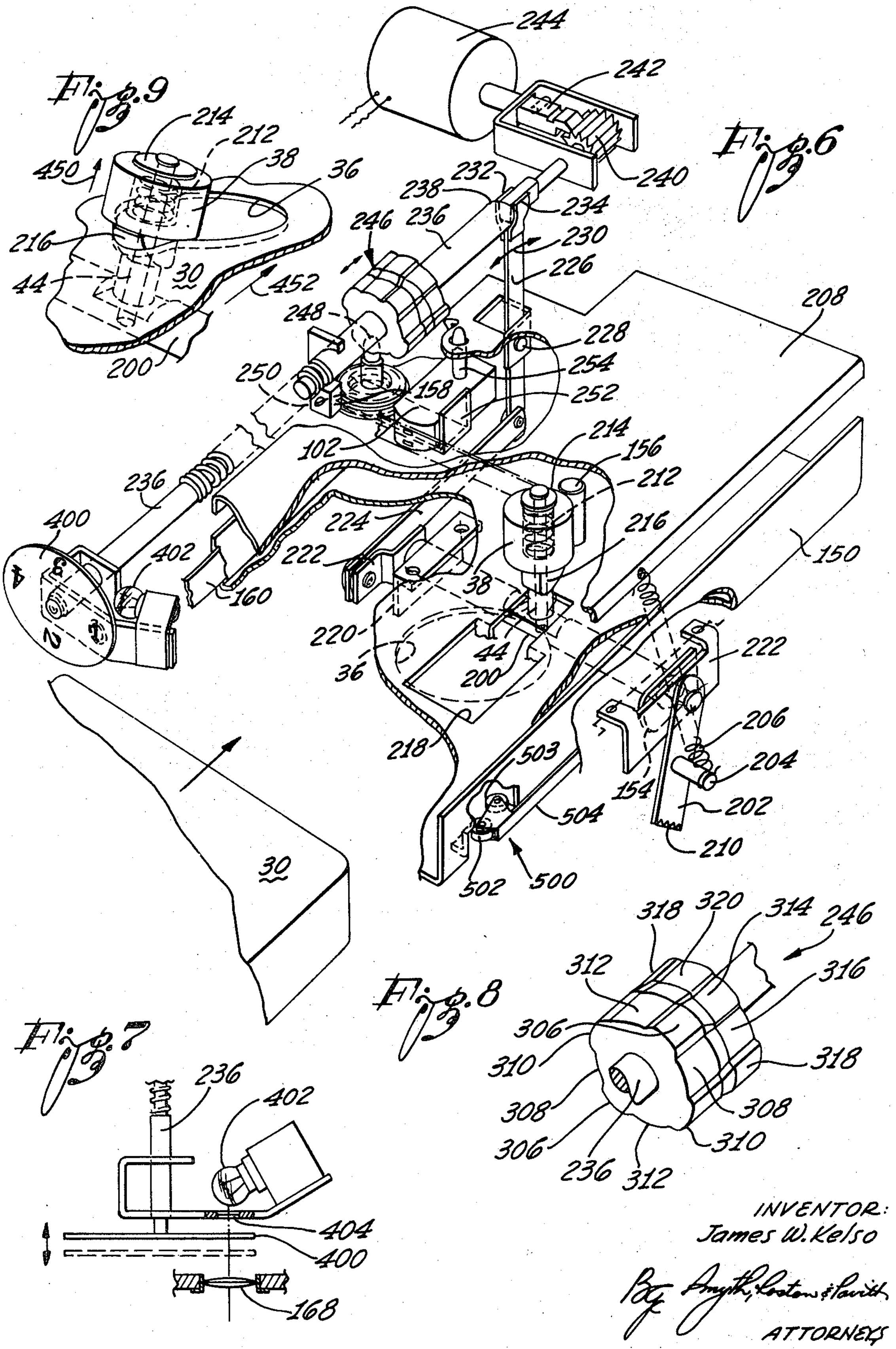

FIGS. 3*a* and 3*b* illustrate the manner in which information is recorded on the magnetic tapes included in the eight-track and four-track magnetic tape cartridges of FIGS. 1 and 2;

FIG. 4 illustrates a two-track magnetic tape reproducing head which may be used to reproduce the information which has been recorded on either the four-track or eight-track magnetic tape shown in FIGS. 3*a* and 3*b*;

FIG. 5 illustrates the external configuration of a magnetic tape cartridge machine constructed in accordance with the teachings of the present invention;

FIG. 6 illustrates the internal mechanism of the magnetic tape cartridge machine of FIG. 5 wherein the internal mechanism is designed to accept and automatically reproduce information recorded on either four-track or eight-track magnetic tape cartridges. In FIG. 6, the internal mechanism is shown in the operative position after receiving a four-track magnetic tape cartridge.

Figure 10:
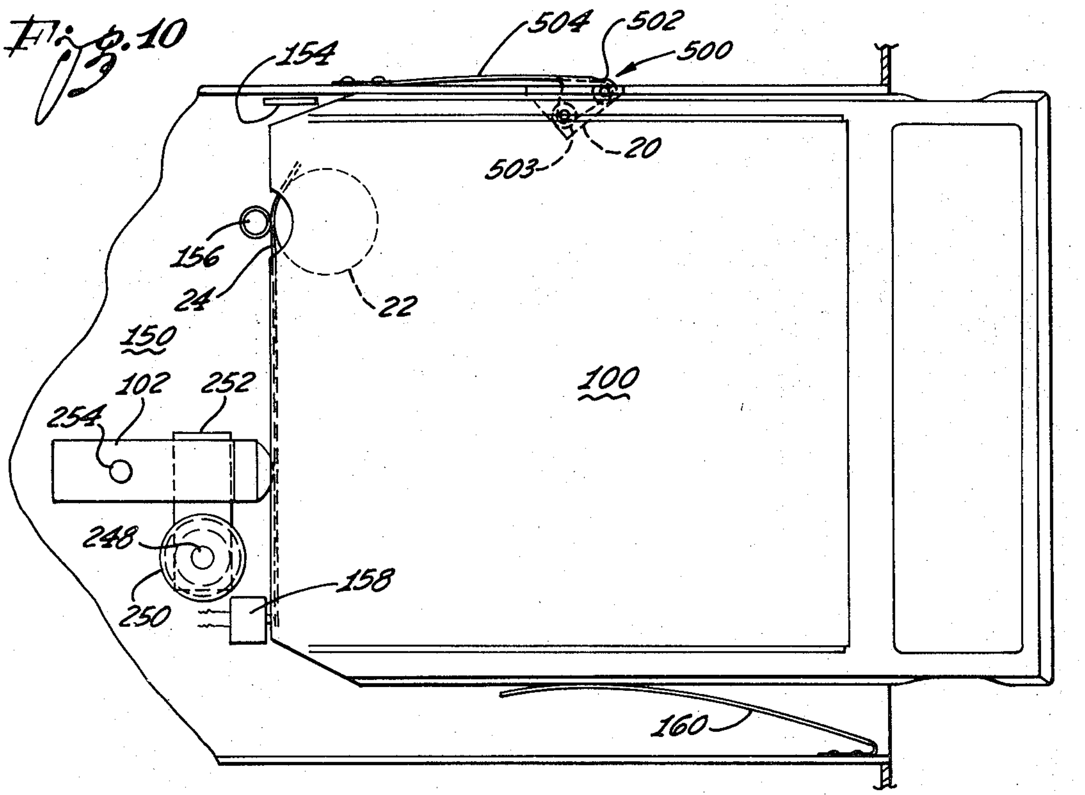
Figure 11:
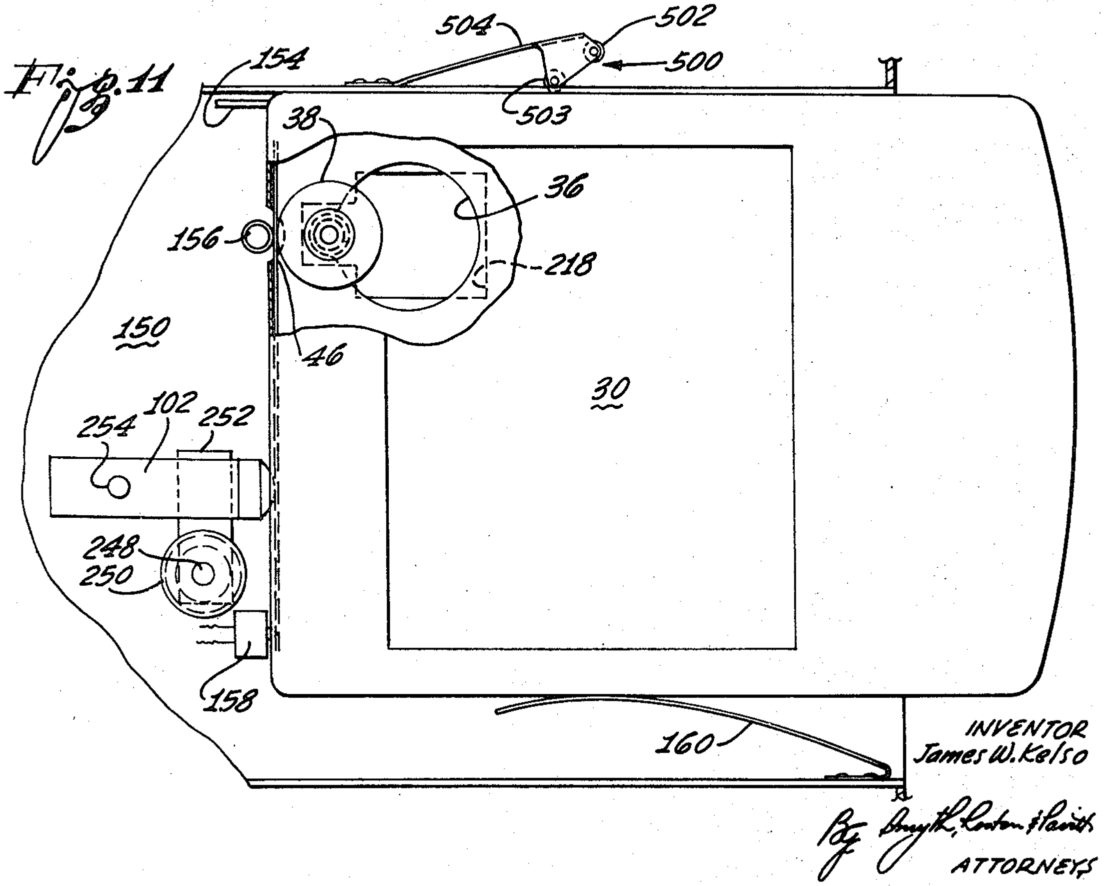

FIG. 7 is a top view of a detailed portion of FIG. 6 and illustrates the optical system for indicating to the operator of the magnetic tape cartridge machine of the present invention which track of information is being reproduced;

FIG. 8 is an enlarged detail view of a composite cam member used in the magnetic tape cartridge of FIG. 6;

FIG. 9 is a detail view illustrating the operation of the pinch roller included in the mechanism of FIG. 6 and specifically illustrating the operation of the pinch roller as a four-track cartridge is being removed from the tape cartridge machine of FIG. 6;

FIG. 10 is a top view of a portion of the mechanism of FIG. 6 and including the eight-track tape cartridge of FIG. 1 inserted for reproduction of information, and FIG. 11 is a top view of a portion of the mechanism of FIG. 6 and including the four-track tape cartridge of FIG. 2 inserted for reproduction of information.

In FIG. 1, a top view of an eight-track magnetic tape cartridge 10 is shown. The tape cartridge 10 includes an indented portion 14 which may be provided so as to more easily grip the cartridge 10 for insertion into and removal from a reproducing apparatus. The front profile of the tape cartridge 10 is tapered as shown by the tapered portions 16 and 18 in FIG. 1. A V-shaped groove 20 is included on the righthand side of the tape cartridge 10 so as to receive a locking member (not shown). The tapered righthand portion 16 of the tape cartridge 10 allows the tape cartridge to be easily inserted past the external locking member.

Included within the magnetic tape cartridge 10 is a built-in pinch roller 22. The built-in pinch roller 22 is disposed adjacent to a magnetic tape 24. The magnetic tape 24 is conventionally arranged within a cartridge 10 as an endless belt so as to provide for a continuous reproduction of the information recorded on the tape 24. The pinch roller 22 provides for a movement of the tape 24 when the tape cartridge 10 is inserted into a reproducing apparatus. The reproducing apparatus includes a rotating external capstan (not shown) which presses the magnetic tape 24 against the pinch roller 22. The tape cartridge 10 includes an open portion 26 along the front edge of the cartridge 10 so as to allow for the engagement of the external capstan (not shown) with the tape 24 and the pinch roller 22.

In addition to the open portion 26, a second open area 28 is provided along the front edge of the cartridge 10 so as to expose the magnetic tape 24 for engagement with a magnetic reproducing head (not shown). The magnetic tape cartridge illustrated in FIG. 1 is normally provided with eight tracks of information recorded on the magnetic tape 24. The eight-track magnetic tape carridge of FIG. 1 is presently being sold to the public in large quantities.

FIG. 2 illustrates a top partially cutaway view of a four-track magnetic tape cartridge 30 which is also being sold to the public in large quantities. The tape cartridge 30 also includes an area 32 for receiving a printed label describing the contents of the cartridge. The four-track cartridge 30 of FIG. 2 does not include tapered front portions as are included with the cartridge of FIG. 1, but the four-track cartridge 30 of FIG. 2 has a slightly rounded edge at all four corners of the cartridge. The front profile of the tape cartridge of FIG. 2 may, therefore, be considered to be substantially square. The top wall of the four-track tape cartridge 30 is shown broken away along the line 34 so as to expose the bottom wall of the cartridge and, as can be seen in FIG. 2, an opening 36 extends through the bottom wall of the tape cartridge 30. The opening 36 allows for the insertion of an external pinch roller 38 included in the reproducing apparatus to be swiveled into the cartridge 30 from underneath the cartridge. The two positions of the pinch roller 38 are shown by the light dotted portion 40 when the pinch roller is underneath the cartridge and the heavy dotted portion 41 when the pinch roller 38 is within the cartridge 30.

The opening 36 in the bottom wall of the cartridge 30 includes a front elongated portion 42 which is engaged by a shaft 44 of the pinch roller 38. The pinch roller 38 is rotatably mounted at the end of the shaft 44. The shaft 44 effectively locks the cartridge 30 in position for the reproduction of the information recorded on a tape 46 included within the cartridge 30. The tape 46 is disposed within the cartridge 30 so as to be adjacent to the pinch roller 38 when the pinch roller is rotated into the cartridge. The cartridge 30 also includes an opening 48 along the front edge of the cartridge so as to allow for an external capstan (not shown) to engage the tape 46. The pinch roller 38 provides for a movement of the tape 46 in accordance with the rotations of the external capstan. The tape cartridge 30 also includes an open portion 50 along the front face of the cartridge 30 so as to allow for the insertion of an external reproducing head (not shown) so as to provide for a reproduction of the information on the tape 46.

FIG. 3*a* illustrates the manner in which information is recorded on the tape 24 of the eight-track tape cartridge of FIG. 1. As can be seen in FIG. 3*a*, the information is recorded on the magnetic tape 24 along eight tracks numbered 1 through 8. When the tape 24 is used for stereo reproduction, four sets of stereo pairs can be recorded on the tape 24. Each set of stereo pairs is composed of pairs of tracks in the following manner. Tracks 1 and 5, which are separated by a distance represented by the arrow 100, constitute a first set of stereo pairs. Tracks 2 and 4 constitute a second set of stereo pairs. Tracks 3 and 7 constitute a third set of stereo pairs, and tracks 4 and 8 constitute a fourth and final set of stereo pairs. All the sets of stereo pairs are separated by the same distance represented by the arrow 100.

FIG. 3*b* illustrates the recording of information on the magnetic tape 46, which is included within the four-track cartridge 30 of FIG. 2. The magnetic tape 46 has information recorded along four tracks numbered 1 through 4. As can be seen in FIG. 3*b*, each of the four tracks of recorded information on tape 46 is more than twice as wide as the individual tracks on the tape 24 of FIG. 3*a*. The four tracks of information on the magnetic tape 46 may also be used to provide stereo information wherein tracks 1 and 3 constitute a first set of stereo pairs and tracks 2 and 4 constitute a second set of stereo pairs. The sets of stereo pairs are also separated by a distance represented by the arrow 100 and the distance 100 is the same for the magnetic tape 24 of FIG. 3*a* and for the magnetic tape 46 of FIG. 3*b*.

FIG. 4 illustrates a two-track magnetic reproducing head 102 which may be used to reproduce the information recorded on the tape 24 of FIG. 3*a* and the information recorded on the tape 46 of FIG. 3*b*. The magnetic head 102 of FIG. 4 includes a pair of air gaps 104 and 106 for reproducing information which has been recorded magnetically on the tapes 24 and 46. The length of the air gaps 104 and 106 has a distance either equal to or less than the width of the tracks on the tape 24 so that the air gaps may reproduce information on the tracks of the tape 24 without overlapping tracks. The air gaps of the magnetic head 102 may also be used to reproduce the information on the tape 46. It is to be appreciated that the construction of the magnetic head 102 is of a standard nature in that the information recorded on the magnetic tapes 24 and 46 produce magnetic flux across the air gaps 104 and 106 and the windings of the magnetic head 102 produce electrical signals in accordance with the magnetic flux. The gaps 104 and 106 are separated by a distance indicated by the arrow 100, which distance is the same for the distance 100 shown in FIGS. 3*a* and 3*b*. It can be seen that if the magnetic head 102 of FIG. 4 can be moved in a transverse direction across the face of the tapes relative to the direction of movement of the tape 24 of FIG. 3*a* or the tape 46 of FIG. 3*b*, six discrete positions of the magnetic head 102 can provide for a reproduction of all of the tracks on both tapes.

As indicated above, the gaps 104 and 106 on the head 102 of FIG. 4 are designed to extend across the width of an individual one of the tracks which are recorded on the tape 24 of FIG. 3*a*. Since the tracks on the tape 46 of FIG. 3*b* are substantially wider than the tracks on the tape 24, the gaps 104 and 106 should be positioned to be approximately in the center of the tracks on the magnetic tape 46 of FIG. 3*b*. It is desirable to provide the air gaps in the center of the tracks of the tape 46 so as to eliminate any problems of crosstalk between tracks and to maximize the output from the head 102. Also, it is desirable to position the air gaps accurately over the tracks of the tape 24 so as to decrease crosstalk and maximize output. The tape cartridge machine of the present invention includes means for automatically switching the position of the magnetic head 102 so that the air gaps are aligned to reproduce the information from either the four-track or eight-track cartridges in accordance with which type of cartridge is inserted in the machine. A further contol is povided which may be actuated by the operator of the tape cartridge machine so as to switch between the tracks after the machine has automatically selected the basic position of the magnetic reproducing head 102 so as to provide for the correct reproduction of four-track or eight-track information.

The output signals from the magnetic tape 46 and the magnetic tape 24 are substantially the same so that the same level of amplification may be used for the output signals from either the tape 24 or the tape 46. There may be some difference in compensation due to the nature of the recorded information on the magnetic tapes 24 and 46 but this may be easily corrected using proper compensation circuits. The two-track magnetic head 102 shown in FIG. 4 provides for the reproduction of information recorded on both four-track and eight-track magnetic tapes. As indicated above, and as will be explained further in greater detail, the basic switching between the reproduction from four-track and eight-track magnetic tapes is accomplished automatically upon the insertion of the cartridge.

FIG. 5 illustrates the external configuration of a tape cartridge machine constructed in accordance with the teachings of the present invention. The tape cartridge machine includes an outer casing 150. A bezel 152 may be mounted at the front of the housing 150. The front bezel 152 includes an opening 151 so as to allow for the insertion of the four-track or eight-track tape cartridges into the tape cartridge machine. Disposed within the tape cartridge machine at the back of the opening 151 are various components such as the magnetic reproducing head 102, a feeler arm 154, a capstan 156, a switch 158 and a spring member 160. The operation of these elements will be explained later in more detail.

Also included in the tape cartridge machine and extending through the front bezel 152 are a pair of volume control knobs 162 and 164. The knobs 162 and 164 control elements such as potentiometers which adjust the level of the output from the individual ones of the stereo tracks. It is, therefore, possible to provide for an exact balance between the outputs from the two stereo tracks by individually adjusting the knobs 162 and 164. A control button 166 also extends through the bezel 152 and may be used to control the loudness contour of the output signal reproduced from the information recorded on the magnetic tapes. For example, one position of the button 166 may provide for a normal loudness contour and a second position of the button 166 may provide for a loudness contour which boosts the bass and treble notes. The boosting of the bass and treble notes is helpful in providing a reproduction of information at a low level.

A window 168 in the bezel 152 may be used to provide a visual indication as to which pair of tracks is being reproduced from the magnetic tape. For example, as shown in FIG. 5, the number 1 shows through the window 168 to indicate that a first pair of stereo tracks is being reproduced. As will be explained later in more detail, the numerals showing through the window 168 are either clear or blurred in accordance with either the insertion of the four-track or eight-track tape cartridges. Finally, a button 170 may extend through the bezel 152 and be used to control the position of the reproducing head 102 so as to reproduce information from the various pairs of tracks on the magnetic tape cartridges inserted in the tape cartridge machine of FIG. 5.

FIG. 6 illustrates the internal mechanism disposed within the housing 150 of FIG. 5 which operates to control the tape cartridge machine so as to automatically replay information on four-track and eight-track magnetic tape cartridges. The present invention automatically distinguishes between the four-track and eight-track magnetic heads so as to provide for the insertion of a pinch roller when a four-track cartridge is inserted into the tape cartridge machine and to automatically position the magnetic reproducing head so that the magnetic reproducing head is properly positioned for reproducing information from either the four-track or eight-track cartridges. The mechanism of FIG. 6 uses the difference in the profile of the front portion of the four-track and eight-track cartridges so as to provide for the automatic operation of the tape cartridge machine. Specifically, the mechanism of FIG. 6 includes the feeler arm 154 to distinguish between the front profiles of the four-track and eight-track tape cartridges so as to provide the automatic control of the playback.

As shown in FIG. 6, the feeler arm 154 is in the down position. The feeler arm would be pushed to the down position upon the insertion of the four-track cartridge

30 which has a substantially square front profile. The feeler arm is connected at one end of a rotatable shaft member 200. The shaft member 200 rotates with the feeler arm 154. Also connected for rotation with the feeler arm 154 is a member 202 which includes a pin 204. A spring 206 extends from the pin 204 to a portion of a wall member 208. The feeler arm 154, in combination with the member 202 and the spring 206, is eccentrically mounted so that the spring 206 controls the rotation of the feeler arm once the feeler arm is rotated past a certain angular position. For example, assuming the feeler arm to be in the up position, when the substantially square portion of the four-track cartridge 30 engages the feeler arm 154, the feeler is pushed by the cartridges so as to rotate. As the feeler arm 154 rotates, the spring 206 is pulled in tension. When the feeler arm 154 is rotated through a particular angle, the spring 206 is pulled past the axis of rotation of the feeler arm 154 so that the spring now acts to rapidly complete the rotation of the feeler arm 154. The eccentric mounting of the spring 206, therefore, provides for a snap action of the feeler arm 154 once the feeler is rotated through the particular angle. The bottom of the member 202 includes a knurled portion 210 which extends through the bottom of the housing 150. The knurled portion 210 may be manually actuated so as to rotate the feeler arm 154.

As the feeler arm 154 is rotated, the rotatable member 200 is also rotated. The pinch roller 38 is connected to the member 200 through the shaft 44 so as to rotate with the member 200. As shown in FIG. 2 and FIG. 6, the shaft 44 is used to lock the four-track cartridge 30 in position. The pinch roller 38 is resiliently mounted to the shaft 44 through the use of a spring 212 which is held in position by a washer 214. The spring mounting of the pinch roller 38 on the shaft 44 allows for a longitudinal movement of the pinch roller 38 along the axis of the shaft 44. The shaft 44 also supports a cam member 216 which is tapered inwardly towards the shaft 44. The cam member 216 may be fixed to the shaft 44 so that the cam member 216 does not rotate and the cam member may be composed of a material which has a coefficient of friction lower than the coefficient of friction of the pinch roller 38.

The wall member 208 includes an opening 218 so that the pinch roller 38 may be rotated through the opening 218 in the wall 208 and through the opening 36 in the bottom wall of the four-track cartridge 30 so as to be positioned within the four-track cartridge for the reproduction of information recorded on the magnetic tape. The shaft 200 is rotatably mounted between brackets 220 and 222 and the brackets are supported on the housing 150.

At the end of the rotatable member 200 opposite the feeler arm 154 is a linkage including three arms 222, 224 and 226. The first arm 222 rotates in accordance with the rotation of the rotatable member 200. The second arm 224 is pivotably connected at the end of the first arm 222. The third arm 226 is pivoted around the point 228 which is in the plane of the wall 208 and the third arm 226 is also pivotably connected to the second arm 224. It can be seen, therefore, that as the member 200 rotates in accordance with rotations of the feeler arm 154, the third arm 226 moves in a direction shown by the arrow 230. The arm 226 includes a pair of fingers 232 and 234.

The fingers 232 and 234 extend into a cutout portion 238 of a shaft 236, The shaft 236 is rotated by a ratchet mechanism including a ratchet wheel 240 and an actuating member 242. The actuating member is driven by a solenoid 244. When the solenoid 244 is activated, the actuating member 242 moves outward so as to engage and rotate the ratchet wheel 240. The ratchet wheel 240 in turn is coupled to the shaft 236 so that the operation of the solenoid 244 controls the rotation of the shaft 236. Mounted on the shaft 236 for movement with the shaft is a composite cam member 246. The composite cam member 246 is used to control the position of the magnetic reproducing head 102. The position of the magnetic reproducing head 102 is controlled through the use of a cam follower 248. The cam follower 248 is mounted on a resilient member 250. The resilient member 250 provides for a positive pressure of the cam follower 248 against the composite cam member 246. The cam follower 248 and resilient member 250 are mounted at one end of a bracket member 252. The other end of the bracket member 252 supports the magnetic reproducing head 102. A pin member 254 extends from the magnetic reproducing head 102 and through an opening in the wall 208. The pin 254 serves as a guide member during movement of the magnetic reproducing head 102. As the position of the cam follower 248 is changed in accordance with the movement of the composite cam member 246, the change in position of the cam follower 248 produces a change in the position of the magnetic reproducing head 102 since the cam follower 247 and the magnetic reproducing head 102 are coupled together by the bracket 252.

The composite cam member 246 may be seen in greater detail in FIG. 8. In FIG. 8, the composite cam member includes two camming areas 300 and 302 which are interconnected by an intermediate area 304. The camming area 300 has four camming surfaces 306, 308, 310 and 312 which are used to control the position of the magnetic reproducing head 102 so as to reproduce the information on the four-track magnetic tape. Actually, opposite camming surfaces 306 and 310 provide for the same first physical position of the magnetic reproducing head 102 and opposite camming surfaces 308 and 312 provide for the same second physical position of the magnetic reproducing head 102. As the composite cam member 246 is rotated and when a four-track cartridge is inserted in the magnetic tape cartridge unit, the camming surfaces 306 through 312 provide for an alternate reproduction of the two sets of stereo pairs of tracks which are included in the magnetic tape 46 within the four-track cartridge 30. The physical displacement of the camming surfaces 306 through 312 provides for a movement of the magnetic reproducing head 102 in accordance with the movement of the cam follower 248 so as to position the air gaps of the magnetic reproducing head 102 so that they are located in the center of the tracks as shown in FIG. 3*b*. As can be seen in FIG. 6, when the four-track tape cartridge 30 is inserted, the feeler arm 154 is activated which rotates the member 200 so as to produce an insertion of the pinch roller 38 into the cartridge 30. At the same time, the mechanism including the arms 222, 224 and 226 produce a movement of the shaft 236 so that the camming area 300 is positioned over the cam follower 248.

When the eight-track cartridge 10 is inserted into the mechanism shown in FIG. 8, the feeler arm 154 is undisturbed so that the rotatable member 200 is not activated. When the rotatable member 200 is not activated, the mechanism including the arms 222, 224 and 226 is in a position so that the second camming area 302 engages the cam follower 248. Actually, the magnetic tape cartridge machine of the present invention is normally in this position prior to the insertion of any tape cartridge. The second camming area 302 also includes four camming surfaces 314, 316, 318 and 320, as shown in FIG. 8. The four camming surfaces 314, 316, 318 and 320 provide for an activation of the cam follower 248 so as to discretely position the reproducing head 102 to reproduce the information on the magnetic tape 24 included in the eight-track tape cartridge 10. Specifically, as shown in FIG. 3*a*, the reproducing head 102 is positioned so as to reproduce the four sets of stereo pairs, and the air gaps of the reproducing head are positioned so that the information is reproduced from the center of the tracks. As can be seen in FIG. 8, the camming surfaces on both the first and second camming areas 300 and 302 are designed so that the cam follower 248 will smoothly ride from one cam surface to the other. Also, as shown in FIG. 3, the intermediate portion 302 of the composite cam member 246 is designed so that the cam follower 248 smoothly rides between the first and second camming areas in accordance with the insertion and removal of the four-track cartridge.

The insertion of the four-track and eight-track cartridges, therefore, provides for an automatic operation of the pinch roller 38 and also provides for an automatic movement of the reproducing head 102 so as to be properly positioned for the reproduction of information from both the four-track and the eight-track magnetic tape cartridges. The solenoid 244 may then be actuated so as to reproduce the information on all of the pairs of tracks on either the four-track or eight-track tape cartridges. The solenoid 244 may be controlled by the button 170 shown in FIG. 5.

The movement of the shaft 236 may also be used so as to provide a visual indication of whether a four-track or an eight-track cartridge has been inserted and also which track of information is being reproduced. This may be accomplished through the use of the mechanism shown in FIG. 7. As the shaft 236 is moved in a longitudinal direction the position of a disc 400 is controlled. As can be seen in FIG. 6, the disc 400 includes a plurality of numbers at different angular positions, specifically the numerals 1, 2, 3 and 4. The disc 400 also rotates in accordance with the rotation of the shaft 236. A source of light 402 shines light through an opening 404. The light passing through the opening 404 impinges on the disc 400 and the particular number which is present before the opening 404 is visually displayed at the window 168, as shown in FIGS. 5 and 7.

The disc 400 moves between the solid position and the dotted position shown in FIG. 7 in accordance with the movement of the shaft 238. The disc 400 is normally in the dotted position, and the disc 400 remains in the dotted position when an eight-track cartridge is inserted into the mechanism. In the dotted position the disc 400 is displaced so that the numerals are in focus at the window 168. When the four-track cartridge is inserted into the machine, the disc 400 is moved to the solid position, as shown in FIG. 7, and the numerals on the disc produce a blurred image at the window 168. The use of the blurred and sharp images at the window 168, therefore, may be used to distinguish between four-track and eight-track tape cartridges. When an eight-track tape cartridge is inserted, the numerals 1, 2, 3 and 4 are successively positioned in the window 168 as the solenoid 244 is activated. The numerals represent the various sets of stereo pairs of information on the eight-track tape cartridge. When a four-track tape cartridge is inserted, the feeler arm 154 is tripped so as to move the shaft 236. This in turn moves the position of the disc 400 and the image is blurred at the window 168. The operator of the magnetic tape cartridge unit of the present invention, therefore, may use the blurred or sharp image to distinguish between four-track and eight-track cartridges.

The magnetic tape cartridge unit of the present invention also includes improvements in the construction of the pinch roller. As shown in FIG. 6, and in more detail in FIG. 9, the pinch roller 38 is resiliently mounted using the spring 212 and the end member 214 so that the pinch roller 38 may move in a direction as shown by the arrow 450. In addition, the cam member 216 is tapered inwardly toward the shaft 44 so as to provide a camming surface. The cam member 216 may be constructed of a material having a coefficient of friction lower than the coefficient of friction of the outside surface of the main body of the pinch roller 38.

The use of the pinch roller described above overcomes a difficulty encountered in the removal of the pinch roller from the four-track cartridge as the four-track cartridge is being removed from the tape cartridge reproducing unit. As can be seen in FIG. 9, the tape cartridge 30 includes the opening 36 in the bottom wall. As explained with reference to FIG. 6, as the tape cartridge 30 is inserted, the substantially square front profile engages the feeler arm 154 and the rotation of the feeler arm produces a rotation of the pinch roller 38 through the opening 36 into the interior of the cartridge 30. Because of the eccentric mounting of the spring 206, the pinch roller 38 is snapped into position at a particular time during the rotation of the feeler arm 154. This time is determined so that the pinch roller 38 enters the opening 36 when the opening 36 has reached a particular position so that the pinch roller does not engage the wall of the opening 36.

Unfortunately, upon the removal of the four-track cartridge from the tape cartridge unit, the pinch roller has tended to engage the wall of the opening 36, thereby causing interference between the pinch roller and the cartridge 30 so as to prevent the removal of the cartridge 30 from the tape cartridge unit. The improved pinch roller construction as shown in FIG. 9 overcomes this difficulty. As can be seen in FIG. 9, the cartridge 30 is shown in a position as it is being removed from the tape cartridge unit of the present invention. The movement of the tape cartridge 30 is in the direction indicated by the arrow 452. As the cartridge 30 is first removed, the shaft 44 is engaged at the front portion of the opening 36. The movement of the shaft 44 starts the rotation of the pinch roller 38. In the prior art the bottom portion of the pinch roller would then tend to engage the wall of the opening 36 thereby providing for interference between the pinch roller and the opening to prevent the removal of the tape cartridge.

In the present construction of the pinch roller 38 shown in FIG. 9, the cam member 216 engages the forward cut out portion of the wall of the opening 36. Since this cam member 216 is tapered, it tends to slide along the wall. As the cam member 216 slides it continues to rotate the pinch roller 38 to clear the opening 36. The pinch roller 36 may actually engage the wall of the opening but the resilient mounting of the pinch roller allows for the movement of the pinch roller as shown by the arrow 450. The movement of the pinch roller is sufficient so that the pinch roller 38 clears the opening 36. The present invention, therefore, allows for an easier removal of the four-track tape cartridge than with the prior construction of the pinch roller.

The present invention also includes an improved locking member 500 as shown in FIG. 6. The locking member 500 is mounted at the end of a resilient member 504. The locking member 500 has a tapered acute angle portion facing the direction of insertion of the tape cartridges. The locking member may also include two small rollers 502 and 503 to reduce the friction between the locking member and the side of the cartridge. The tapered acute angle portion allows for a much easier insertion of the four-track and eight-track tape cartridges. In the prior art the use of a large roller as the locking member would sometimes produce an interference between the roller and the four-track cartridge, thereby preventing the insertion of the four-track tape cartridge. The tapered acute angle portion of the locking member 500 allows for the locking member to pass the substantially square front profile of the four-track cartridge thereby eliminating interference between the locking member and the four-track cartridge. This may be seen in greater detail with reference to FIGS. 10 and 11 which show the eight-track and four track cartridges inserted in the tape cartridge unit of the present invention. It is to be appreciated that the locking member 500 need not include the rollers 502 and 503 but the rollers merely reduce friction.

As can be seen in FIG. 10, when the eight-track cartridge 10 is inserted into the tape cartridge reproducing unit of the present invention, the feeler arm 154 is not engaged since the feeler arm sits within the tapered front portion of the cartridge 10. The pinch roller 38, therefore, remains its downward position and the composite cam member 246 shown in FIGS. 6 and 8 controls the magnetic reproducing head 102 to be in the proper position to reproduce information from the eight-track magnetic tape. In the fully inserted position of the eight-track cartridge 10 shown in FIG. 10, the capstan 156 engages the tape 24 and the tape is pressed against the pinch roller 22 so as to produce movement of the tape 24 in accordance with the rotation of the capstan 156.

As the tape 24 is moved by the capstan 156, the magnetic reproducing head 102 reproduces the information on various ones of the tracks on the tape. The particular ones of the tracks are determined in accordance with the position of the reproducing head 102 which in turn is determined by which one of the camming surfaces of the composite cam member 246 shown in FIGS. 6 engages the cam follower 248. It is noted that the switch 158 is also controlled by the insertion of the cartridge 10 and the switch 158 controls the application of electrical energy to the tape cartridge reproducing unit. The spring 160 maintains a positive pressure against the left side of the cartridge. Finally, the locking member 500 engages the slot 20 on the righthand side of the tape cartridge 10 and provides for a forward pressure of the tape cartridge 10 so that the capstan 156 and the reproducing head 102 both firmly contact the tape 24.

Due to the configuration of the locking member 500, the tape cartridge 30 shown in FIG. 11 may be easily inserted. The tapered portion of the locking member 500 easily passes by the substantially square front profile of the tape cartridge 30 and during the reproduction of information from the cartridge 30 the locking member 500 is in the position shown in FIG. 11. It can also be seen in FIG. 11 that the feeler arm 154 is moved to the downward position. The feeler arm 154 is engaged and rotated by the front portion of the tape cartridge 30. The rotation of the feeler arm 154 provides for the insertion of the pinch roller 38 within the cartridge 30 through the opening 36 in the bottom wall of the cartridge. The shaft 44 of the pinch roller 38 provides for the locking of the cartridge 30. The shaft 44 also provides a forward pressure so that the capstan 156 may produce a movement of the tape 46 within the cartridge 30. The tape 46 moves in response to the rotation of the capstan 156. In addition, the rotation of the feeler arm 154 also provides for a switching of the composite cam member 246 as shown in FIG. 6 so that the position of the reproducing head 102 is varied so as to reproduce the information from the four-track tape. Further movements of the reproducing head 102 are controlled by rotations of the composite cam member 246.

It may be seen, therefore, that the magnetic tape cartridge reproducing unit of the present invention provides for substantial improvements over prior art reproducing units. The tape cartridge unit of the present invention provides for an automatic playback of both four-track and eight-track magnetic tape cartridges. The tape cartridge unit distinguishes between these different types of cartridges and provides for the insertion or non-insertion of an external pinch roller. In addition, the insertion of the four-track or eight-track tape cartridges automatically controls the position of a composite cam member which in turn controls the position of a magnetic reproducing head so that the magnetic reproducing head may properly reproduce information from either the four-track or the eight-track magnetic tape cartridges. Other improvements in the tape cartridge reproducing unit of the present invention include the use of a resiliently mounted rotatable pinch roller and a locking member having an acute angle portion. These devices operate so as to provide for an easy insertion and removal of both four-track and eight-track tape cartridges.

Although the invention has been described with reference to a particular embodiment, it is to be appreciated that various adaptations and modifications may be made.

What is claimed is:

1. In a magnetic tape cartridge machine for reproducing the information recorded on either first or second types of magnetic tape cartridges and with the first cartridge containing magnetic tape having information recorded on four tracks and including an opening for receiving an external pinch roller and having a substantially square front portion and with the second cartridge containing magnetic tape having information recorded on eight tracks and including a built-in pinch roller and having a tapered front portion corresponding in position to the square front portion of the first cartridge, a movable feeler arm positioned to engage the square front portion of the first cartridge and to be received within the tapered portion of the second cartridge so as to provide a movement of the feeler arm in response to the insertion of the first cartridge into the tape cartridge machine and to provide no movement of the feeler arm in response to the insertion of the second cartridge into the tape cartridge machine, a magnetic reproducing head movably mounted within the tape cartridge machine for reproducing the information contained on the magnetic tapes within the first and second tape cartridges, a movable composite cam member coupled to means for controlling the position of the magnetic reproducing head and containing two camming areas each containing camming surfaces and with the first camming area containing camming surfaces for positioning the head to reproduce the information contained in the first cartridge and with the second camming area containing camming surfaces for positioning the head to reproduce the information contained in the first cartridge and with the second camming area containing camming surfaces for positioning the head to reproduce the information contained in the second cartridge and with the movable composite cam member normally positioned to reproduce the information contained in the second tape cartridge, a rotatable pinch roller, and means intercoupling the feeler arm, the pinch roller and the composite cam member and responsive to the movement of the feeler arm for radially rotating the pinch roller through the opening in the first cartridge and for moving the composite cam member to reproduce the information contained in the first tape cartridge, the pinch roller being resiliently mounted so as to provide for a linear movement of the pinch roller along its axis of revolution and with the pinch roller engaging the wall of the opening in the first cartridge as the first cartridge is removed and with the resilient mounting of the pinch roller allowing for the linear movement of the pinch roller so that the pinch roller clears the opening upon removal of the first cartridge, said pinch roller being resiliently biased in a direction opposite the direction of the linear motion.

2. In the magnetic tape cartridge machine of claim 1 including a cam member located at the bottom surface of the pinch roller and wherein the pinch roller is resiliently mounted so as to provide for a linear movement of the pinch roller along its axis of revolution and with the cam member engaging the wall of the opening in the first cartridge to provide for a radial rotation of the pinch roller through the opening in the first cartridge as the first cartridge is removed and with the resilient mounting of the pinch roller allowing for the linear movement of the pinch roller along its axis of revolution so that the pinch roller clears the opening upon removal of the first cartridge.

3. In a magnetic tape cartridge machine for reproducing the information recorded on a first magnetic tape cartridge and with the first cartridge including an opening for receiving an external pinch roller and having a substantially square front portion, a movable feeler arm positioned to engage the square front portion of the first cartridge so as to provide a movement of the feeler arm in response to the insertion of the first cartridge into the tape cartridge machine, a rotatable pinch roller, first means intercoupling the feeler arm and the pinch roller and responsive to the movement of the feeler arm for radially rotating the pinch roller through the opening in the first cartridge, and second means for resiliently mounting the rotatable pinch roller to provide for a linear movement of the pinch roller along its axis of revolution and with the pinch roller engaging the wall of the opening in the first cartridge as the first cartridge is removed from the magnetic tape cartridge machine and with the resilient mounting of the pinch roller allowing for the linear movement of the pinch roller so that the pinch roller clears the opening upon removal of the first cartridge, said pinch roller being resiliently biased in a direction opposite the direction of the linear motion.

4. In the magnetic tape cartridge machine of claim 3 additionally including a tapered cam member mounted on the pinch roller shaft to engage the wall of the opening so as to provide for a radial rotation of the pinch roller through the opening in the first cartridge and with the linear movement of the pinch roller along its axis of revolution in accordance with the camming action.

5. In the magnetic tape cartridge machine of claim 4 wherein the cam members is provided for by a member having a surface of lower coefficient of friction than the pinch roller.

References Cited

UNITED STATES PATENTS

| | | | |
|---|---|---|---|
| 3,208,363 | 9/1965 | Easterly | 352—72 |
| 3,266,395 | 8/1966 | Kremp | 352—72 |
| 3,337,104 | 8/1967 | Wilson | 226—90 |
| 3,422,740 | 1/1969 | Nerwin | 352—78 |
| 3,337,105 | 8/1967 | Wilson | 226—70 |
| 3,400,227 | 9/1968 | Lear et al. | 177—100.2 |
| 3,388,911 | 6/1968 | Wilson et al. | 274—4 |
| 3,027,112 | 3/1962 | Flan | 242—55.13 |

LEONARD FORMAN, Primary Examiner

D. A. DEARING, Assistant Examiner

U.S. Cl. X.R.

179—100.2; 226—90